United States Patent Office 3,485,922
Patented Dec. 23, 1969

3,485,922
INJECTABLE SOLUTIONS OF THE TRI-(HYDROXY-METHYL)-AMINOMETHANE DERIVATIVE OF 3-($\alpha$-ACETONYLBENZYL)-4-HYDROXYCOUMARIN AND PROCESSES FOR PREPARING THE SAME
Nasri Wadih Badran, Elmhurst, N.Y., assignor to American Pharmaceutical Company, New York, N.Y., a corporation of New Jersey
No Drawing. Filed May 25, 1966, Ser. No. 552,684
Int. Cl. A61k 27/00; C07d 7/28
U.S. Cl. 424—281        5 Claims

ABSTRACT OF THE DISCLOSURE

Tris - (hydroxymethyl) - aminomethane derivative of 3 - ($\alpha$ - acetonylbenzyl) - 4 - hydroxycoumarin enables a sterile, stable aqueous, injectable preparation to be prepared which hitherto was not possible with 3 - ($\alpha$ - acetonylbenzyl) - 4 - hydroxycoumarin. The sterile, injectable preparation is useful as an anticoagulant and finds utility in the treatment of intra-vascular clots, thrombophlebitis, acute embolic and thrombolic occlusion of cerebral and peripheral arteries, myocardial infarction, cornnary thrombosis and the like.

---

The present invention relates to anticoagulants which prolong blood clotting time and more particularly to a new and useful amine derivative of 3-($\alpha$-acetonylbenzyl)-4-hydroxycoumarin, stable aqueous injectable solutions thereof and procedure for the preparation of the same.

The compound 3 - ($\alpha$ - acetonylbenzyl) - 4 - hydroxycoumarin is well known under the name Warfarin. It is useful both as a rodenticide since it causes fatal hemorrhages in rats and as an anticoagulant for medicinal use. Warfarin, however, is practically insoluble in water, which has proved to be a serious disadvantage in its use both as a rodenticide and for clinical purposes. In order to try to overcome this lack of solubility in water, Warfarin has heretofore been converted into its sodium salt which is sometimes known as Sodium Warfarinate or more usually Warfarin Sodium. While the conversion of Warfarin to its sodium salt has some advantage with respect to water solubility, the aqueous solution thereof is quite unstable to the extent that the solution cannot be made up ahead of time and stored ready for use, but must be made up freshly just prior to its use. This instability of an aqueous solution of Warfarin Sodium is highly disadvantageous and has greatly limited the value of the medicament. Reference in this connection is made to U.S. Patents 2,777,859 and 2,765,321, which both relate to aqueous solutions of Warfarin Sodium and the former of which states that the solutions are clinically unsatisfactory unless certain involved operations are carried out. There is thus a residual important problem remaining unsolved in connection with this potentially valuable anticoagulant.

My own research and investigation have been directed to a solution of the problem outlined above and in accordance with the present invention, it has now been found that it is possible to make a stable aqueous solution of 3 - ($\alpha$ - acetonylbenzyl) - 4 - hydroxycoumarin in which can be stored and used as required and which does not deteriorate during storage. My research and investigation have been directed to attempts to find some other salt or derivative of Warfarin which would have the desired water solubility coupled with stability so that stable aqueous solutions of desired concentrations and potency can be produced and kept in stock for prolonged periods of time ready for use whenever required. While my new Warfarin derivative and its stable aqueous solutions are useful as rodenticides in the same general manner as Warfarin or Warfarin Sodium, my invention is more particularly directed to the new derivative and stable aqueous solutions thereof for clincal purposes to induce therapeutic hypothrombinemia in patients with or susceptible to intravascular clots, thrombophlebitis, acute embolic and thrombolic occulsion of cerebral and peripheral arteries, myocardial infarction and coronary thrombosis.

After extensive investigation, I have found only one new substance which meets all the necessary requirements and which is capable of combining chemically with Warfarin to produce a water soluble derivative and which in solution is stable and substantially neutral and which is not subject to deterioration or adverse chemical change even over prolonged periods of time, especially when the solution is sealed into glass ampules of highly resistant borosilicate (Type I) as described in U.S.P. XVII which is readily available and usually preferred for injectables.

The new substance is the amine tris-(hydroxymethyl)-aminomethane having the formula:

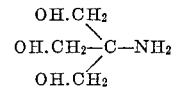

This amine is sometimes known as 2-amino-2-hydroxymethyl-1,3-propanediol having the formula:

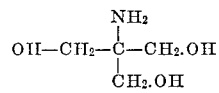

but these are identical and depicted alternatively by the above formulas to which different names have been ascribed. This amine by whichever name it is identified is per se known as THAM or Tromethamine which are respectively the brand and generic names. The amine itself is described in the Annals of the New York Academy of Sciences, Volume 92, Article 2 of June 17, 1961, pages 333 to 812. While at least on a theoretical basis other amines could conceivably be employed, it has been most surprising to find in my researches and investigations that the above amine is the most satisfactory since it is devoid of toxic and detrimental pharmacological effects. This amine is therefore unique for the purposes of the present invention to which it has never heretofore been applied. This is all the more unexpected since much work has been done with Warfarin, but only the Warfarin Sodium has been made in injectable form and as above pointed out, it is subject to important and serious disadvantages in that promptly after the aqueous solution of Warfarin Sodium is made, it must be converted into dry form under sterile conditions and then immediately before use, it must be reconstituted into a solution by the addition of a solvent which is usually sterile distilled water. This is the procedure which is being followed and while Warfarin Sodium is a useful and valuable anticoagulant, its aqueous solutions are highly unstable which accounts for the necessity of forming a dry product therefrom and then freshly preparing a solution immediately before its use. It will be seen from this that it would be highly advantageous, not only from a practical and economical point of view, but from a clinical and medical point of view, to have available a pure stable aqueous solution which can be stored in solution form for an indefinitely long period of time and ready for instant use at any time.

Using THAM, I have successfully prepared a stable aqueous substantially neutral solution of Warfarin for parenteral administration and this is illustrated by the following example:

Example

| | Grams |
|---|---|
| Warfarin | 1 to 20.0 |
| Propylene glycol | 0 to 100.0 |
| Adipic acid | 0 to 10.0 |
| THAM R.G. | 0.5 to 25.0 |
| Sodium bisulfite | 0 to 5.0 |
| EDTA $Na_2$—$2H_2O$ | 0 to 0.2 |
| Water q.s. 50 to 1000.00 ml. | |

Referring to the components set forth above, the Warfarin is mixed with a portion of the water or with the propylene glycol when used at room temperature. The THAM and the remaining ingredients if used are dissolved in approximately 40 to 850 milliliters of water and the resulting solution is added to the Warfarin suspension and stirred gently and continuously while heating to a temperature in the range of about 60 to 70° C., preferably about 65° C., until the Warfarin is completely dissolved. The volume of the solution is then adjusted and the solution is clarified by filtration with any suitable or known clarifying and/or sterilizing filter or filter aid known in the art of pharmaceutical manufacture. The standard precautions are taken for the production of a sterile solution. The final solution is colorless and has a substantially neutral pH which may range from about 7.2 to 8.2 and within this pH range the solution remains stable at room temperature and at temperatures as high as 125° C. when it is sealed in glass ampules of highly resistant borosilicate (Type I) as described in U.S.P. XVII.

In solutions shown as above described, and which may have a wide range of concentration depending upon the specific amounts of the components listed in the foregoing example, the 3-($\alpha$-acetonylbenzyl)-4-hydroxycoumarin in its enolic form and the tris-(hydroxymethyl)-aminomethane react with one another to form the water soluble tris-(hydroxymethyl)-aminomethane derivative of 3-($\alpha$-acetonylbenzyl)-4-hydroxycoumarin and for best results the reactants may be caused to react with one another in a vacuum at low temperature and at substantially neutral pH. This new derivative is not only highly satisfactory as an anticoagulant, but has excellent water solubility as shown in the example from which it will be observed that it is not essential to have present and propylene glycol, adipic acid, sodium bisulfite or the dihydrate of the sodium salt of ethylene diamine tetraacetic acid and while varying amounts of such components can advantageously be utilized, the Warfarin and the THAM are the essential components along with the water and the other components are optional, but preferable, as evidenced by the fact that their amount may be zero.

The fact that the soluble derivative obtained is an amine enolate, i.e. a salt, is proved by acidification of the aqueous solution prepared as above described because the Warfarin thereupon reprecipitates quantitatively in pure form and this has been confirmed by available analytical procedures.

The invention resides in the water soluble tris-(hydroxymethyl)-aminomethane derivatives of 3-($\alpha$-acetonylbenzyl)-4-hydroxycoumarin, its stable aqueous injectable solutions in which connection there is no necessity for isolating the reaction product or having it in a dry form as well as the procedure for the preparation of the aforesaid stable aqueous injectable solutions. It is further to be understood, however, that since the solutions are stable and substantially neutral, they can be incorporated into ointments, creams, pastes or lotions and such are to be considered as falling within the invention which thus also covers cosmetic and pharmaceutical preparations for external topical application.

What is claimed is:

1. A stable aqueous injectable solution comprising a material produced by reacting 3-($\alpha$-acetonylbenzyl)-4-hydroxycoumarin and tris - (hydroxy - methyl)aminomethane in water in the proportions of 1 to 20 grams of 3-($\alpha$-acetonylbenzyl) - 4 - hydroxycoumarin to 0.5 to 25 grams of tris-(hydroxymethyl)aminomethane per 50 to 1000 ml. of water to form an amine salt of the coumarin compound, said solution having a pH in the range of 7.2 to 8.2 and retaining its stability at temperatures up to 125° C.

2. A stable aqueous injectable solution according to claim 1 in which are incorporated up to 100 grams of propylene glycol, up to 10 grams of adipic acid, up to 5 grams of sodium bisulfite and up to 0.2 gram of the dihydrate of the sodium salt of ethylene diamine tetraacetic acid.

3. A process for the preparation of the stable aqueous injectable solution of claim 2, which comprises mixing the 3-($\alpha$-acetonylbenyl)-4-hydroxycoumarin with part of the water or propylene glycol at room temperature, separately dissolving the tris-(hydroxymethyl)-aminomethane, adipic acid, sodium bisulfite and dihydrate of the sodium salt of ethylene diamine tetraacetic acid in sterile water, adding the latter solution to the mixutre of 3-($\alpha$-acetonylbenzyl)-4-hydroxycoumarin with water or propylene glycol, stirring gently and continuously under heating to a temperature in the range of about 60 to 70° C. until a clear solution is obtained, adjusting the volume of the solution and subjecting the whole to sterilizing filtration.

4. A process according to claim 3 in which the heating is carried out at about 65° C.

5. A process according to claim 3 in which the 3-($\alpha$-acetonylbenzyl)-4-hydroxycoumarin and the tris - (hydroxymethyl)-aminomethane are caused to react with one another in a vacuum at low temperature and at substantially neutral pH.

References Cited

UNITED STATES PATENTS

| 2,765,321 | 10/1956 | Schroeder et al. | 260—343.2 |
| 2,777,859 | 1/1957 | Link | 260—343.2 |
| 2,932,652 | 4/1960 | Molnar | 260—343.2 |
| 3,141,894 | 7/1964 | Billen et al. | 260—343.2 |

OTHER REFERENCES

Chem. Abst., 62, p. 13129e and 13746b (1965).
Chemical Abstracts, vol. 51: 6747h (1957).
Chemical Abstracts, vol. 62: 13129e (1965).

ALBERT T. MEYERS, Primary Examiner
STANLEY J. FRIEDMAN, Assistant Examiner

U.S. Cl. X.R.
260—343.2